(12) United States Patent
Fernandez et al.

(10) Patent No.: US 7,671,772 B2
(45) Date of Patent: Mar. 2, 2010

(54) METHOD AND APPARATUS FOR PRODUCING A LINEARIZED AMPLIFIED CONTINUOUS WAVE (CW) SIGNAL

(75) Inventors: Andrew D. Fernandez, Sunnyvale, CA (US); Nick Tutillaro, Corvallis, OR (US)

(73) Assignee: Agilent Technologies, Inc., Santa Clara, CA (US)

( * ) Notice: Subject to any disclaimer, the term of this patent is extended or adjusted under 35 U.S.C. 154(b) by 329 days.

(21) Appl. No.: 11/904,726

(22) Filed: Sep. 28, 2007

(65) Prior Publication Data

US 2009/0088872 A1     Apr. 2, 2009

(51) Int. Cl.
*H03M 1/00*   (2006.01)
(52) U.S. Cl. .................................. 341/142; 341/144
(58) Field of Classification Search .............. 341/142, 341/144
See application file for complete search history.

(56) References Cited

U.S. PATENT DOCUMENTS 7,375,667 B2 *  5/2008  Poulton et al. ............... 341/144

* cited by examiner

*Primary Examiner*—Khai M Nguyen (57) ABSTRACT

In one embodiment, at least one parameter set for at least one harmonic of a continuous wave (CW) signal is digitally generated in response to a parameter set for the CW signal. In response to the parameter set for the CW signal, the CW signal is synthesized; and in response to the at least one parameter set for the at least one harmonic of the CW signal, at least one nulling tone is synthesized. The CW signal and the at least one nulling tone are amplified; and the amplified CW signal and the at least one amplified nulling tone are summed to produce a linearized amplified CW signal. Other embodiments are also described.

20 Claims, 9 Drawing Sheets

Spur Levels Before and After Linearization

| | $f_c$ | $2*f_c$ | $3*f_c$ | $4*f_c$ | $5*f_c$ |
|---|---|---|---|---|---|
| Uncorrected PA Spur Level (dBc) | 0.058 | -38.43 | -50.16 | -60.87 | -76.42 |
| Feedforward Nulling Spur Level | - | -38.14 | -51.28 | -61.52 | -75.58 |
| Magnitude estimate error | - | 8% | -20% | -7% | 12% |
| Corrected PA Spur Level (dBc) | 0.058 | -67.74 | -68.46 | -83.38 | -93.81 |

METHOD AND APPARATUS FOR PRODUCING A LINEARIZED AMPLIFIED CONTINUOUS WAVE (CW) SIGNAL

BACKGROUND

Figure 9:
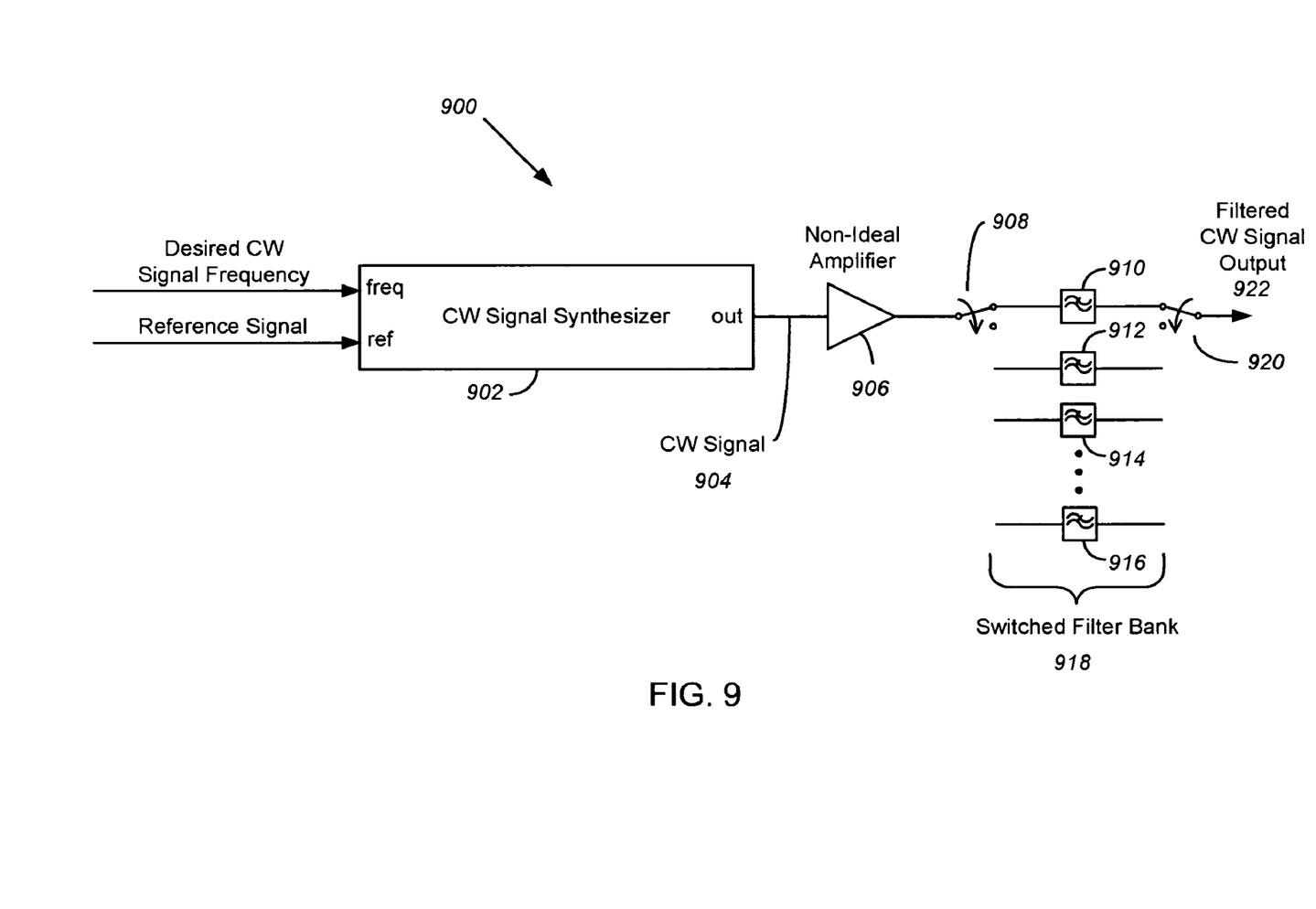
FIG. 9 illustrates exemplary apparatus for removing unwanted harmonics from a CW signal, by filtering the CW signal after amplification.

The traditional way to remove unwanted harmonics from a continuous wave (CW) signal, and thereby linearize the CW signal, is to filter the CW signal after amplification. Exemplary apparatus 900 for doing this is shown in FIG. 9 and comprises a signal synthesizer 902, a non-ideal amplifier 906 and a switched filter bank 918. In operation, the CW signal synthesizer 902 receives an indication of a desired CW signal frequency (at input freq) and a reference signal (at input ref), and in response synthesizes a CW signal 904. The CW signal 904 is then amplified by the amplifier 906, and the amplified CW signal is filtered by a filter of the switched filter bank 918.

When the frequency of the CW signal 904 changes (i.e., because of a change in the desired CW signal frequency), the frequencies of the harmonics produced by the amplifier 906 also change. That is, the 2nd harmonic is located at $2*f_c$, the third at $3*f_c$, and so on (where $f_c$ is the frequency of the CW signal 904). Because the filters 910, 912, 914, 916 of the switched filter bank 918 are typically built with passive components, and have fixed passbands and stopbands, changes in the harmonics produced by the amplifier 906 require different filters 910, 912, 914, 916 to be switched into the signal path between the amplifier 906 and the filtered CW signal output 922 (e.g., via switches 908 and 920).

The above approach works well so long as the unwanted harmonics produced by the amplifier 906 are sufficiently suppressed by the filters 910, 912, 914, 916 of the switched filter bank 918. However, if the filters 910, 912, 914, 916 do not provide adequate filtering over a wide enough range of frequencies, the performance of the apparatus 900 shown in FIG. 9 can suffer.

BRIEF DESCRIPTION OF THE DRAWINGS

Illustrative embodiments of the invention are illustrated in the drawings, in which.

DETAILED DESCRIPTION

Figure 1:
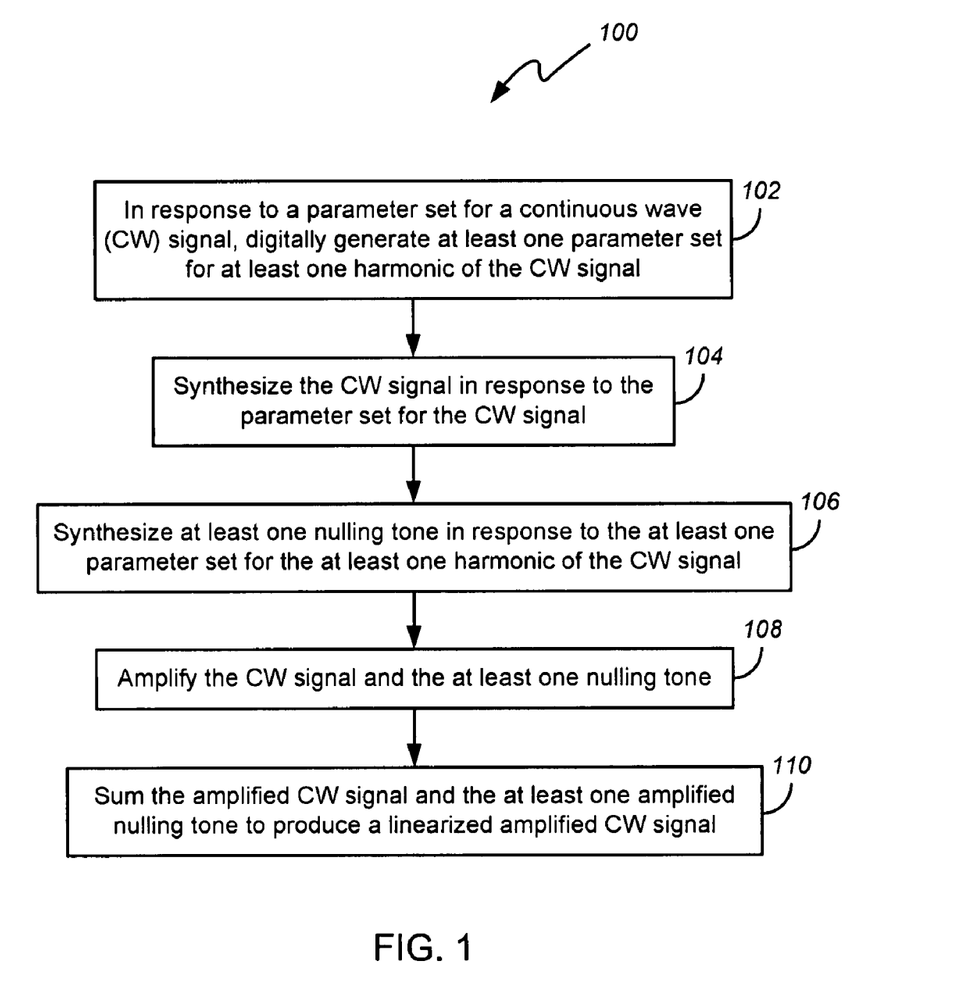
FIG. 1 illustrates an exemplary method for producing a linearized amplified CW signal.

FIG. 1 illustrates an exemplary new method 100 for producing a linearized amplified CW signal. In accord with the method 100, at least one "parameter set", for at least one harmonic of a CW signal, is digitally generated in response to a "parameter set" for the CW signal (at block 102). Each of the parameter sets may include, for example, a frequency indicator, an amplitude indicator, and/or a phase indicator. In response to the parameter set for the CW signal, the CW signal is synthesized (at block 104); and in response to the at least one parameter set for the at least one harmonic of the CW signal, at least one nulling tone is synthesized (at block 106). The CW signal and the at least one nulling tone are amplified (at block 108); and the amplified CW signal and the at least one amplified nulling tone are then summed to produce a linearized amplified CW signal (at block 110).

Figure 2:
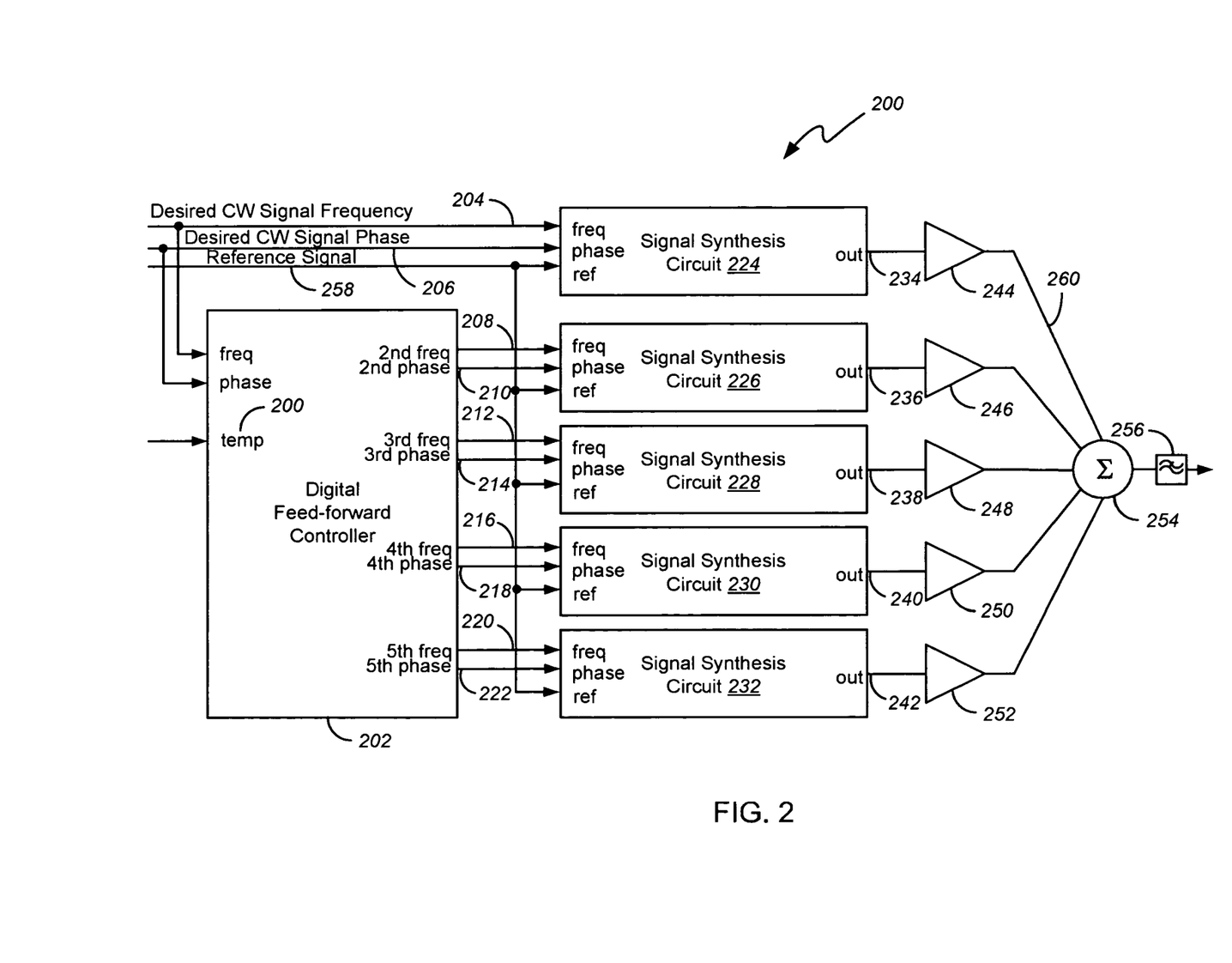
FIG. 2 illustrates first exemplary apparatus for implementing the method of FIG. 1 and other methods.

By way of example, the method 100 may be implemented by apparatus 200 such as that which is illustrated in FIG. 2. The apparatus 200 comprises a digital feed-forward controller 202 that is configured to, in response to a parameter set for a CW signal, generate at least one parameter set for at least one harmonic of the CW signal. By way of example, the parameter set for the CW signal is shown to comprise a frequency indicator 204 (i.e., a desired CW signal frequency received at the freq input of the controller 202) and a phase indicator 206 (i.e., a desired CW signal phase received at the phase input of the controller 202). Similarly, and by way of example, each of the parameter sets for the harmonics of the CW signal is shown to comprise a frequency indicator and a phase indicator (labeled in FIG. 2 as 2nd freq 208 and 2nd phase 210, 3rd freq 212 and 3rd phase 214, 4th freq 216 and 4th phase 218, and 5th freq 220 and 5th phase 222).

The apparatus 200 further comprises a plurality of signal synthesis circuits 224, 226, 228, 230, 232, including i) a first signal synthesis circuit 224 configured to synthesize the CW signal 234 in response to the parameter set for the CW signal, and ii) at least one additional signal synthesis circuit 226, 228, 230, 232 configured to respectively synthesize at least one nulling tone 236, 238, 240, 242 in response to the at least one harmonic of the CW signal. Of note, the signal synthesis circuits 224, 226, 228, 230, 232 function as digital-to-analog converters.

The apparatus 200 further comprises a plurality of non-ideal amplifiers 244, 246, 248, 250, 252 for respectively amplifying the CW signal 234 and at least one nulling tone 236, 238, 240, 242 output from the signal synthesis circuits 224, 226, 228, 230, 232. In some embodiments, the non-ideal amplifiers 244, 246, 248, 250, 252 may be power amplifiers, although they need not be. A summer 254 sums the amplified CW signal and at least one amplified nulling tone to produce a linearized amplified CW signal 256.

Preferably, each of the signal synthesis circuits 224, 226, 228, 230, 232 receives a common reference signal 258, such as a 10 MHz sign wave, and is configured to phase lock to the common reference signal 258.

The digital feed-forward controller 202 (or means for generating at least one parameter set for at least one harmonic of the CW signal) may be implemented in various ways. In one embodiment, the digital feed-forward controller 202 may comprise one or more lookup tables, and the parameter set(s) for the CW signal harmonic(s) may be generated by indexing one or more lookup tables in response to the parameter set for the CW signal. In another embodiment, the digital feed-forward controller 202 may comprise one or more digital filters that generate the parameter set(s) for the CW signal harmonic(s) in response to the parameter set for the CW signal. In still another embodiment, the digital feed-forward controller 202 may implement a mathematical function, such as a polynomial function, to derive the parameter set(s) for the CW signal harmonic(s) from the parameter set for the CW signal.

The complexity of the table(s), filter(s) or function(s) implemented by the digital feed-forward controller 202 may vary depending on the characteristics of the non-ideal amplifiers 244, 246, 248, 250, 252 and the degree of linearization desired. Preferably, the digital feed-forward controller 202 is calibrated (e.g., at the factory or on power-up) to account for the characteristics of the amplifiers 244, 246, 248, 250, 252. Calibration may comprise measuring the phases and amplitudes of the harmonics produced by the amplifiers 244, 246, 248, 250, 252. In some cases, calibration may take into account the characteristics of each amplifier 244, 246, 248, 250, 252, and in other cases, calibration may assume that all of the amplifiers 244, 246, 248, 250, 252 have substantially identical characteristics, or that the characteristics of the amplifier 244 are determinative.

The characteristics of the non-ideal amplifiers 244, 246, 248, 250, 252 will often vary with temperature, and the amplitudes and phases of their harmonics are therefore likely to change with temperature. As a result, the digital feed-forward controller 202 may be calibrated for different operating temperatures, and the digital feed-forward controller 202 may be configured to generate the parameter set(s) for the CW signal harmonic(s) in response to a temperature of one or more of the amplifiers 244, 246, 248, 250, 252.

As already mentioned, calibration of the digital feed-forward controller 202 may be performed at the factory or on power-up. The latter can be facilitated, for example, by a radio frequency (RF) measurement path between the amplifier 244 and a measurement circuit of a device (e.g., an instrument) in which the apparatus 200 is installed.

The signal synthesis circuits 224, 226, 228, 230, 232 (or means for synthesizing the CW signal in response to the parameter set for the CW signal, and means for synthesizing at least one nulling tone in response to the at least one harmonic of the CW signal) may also be implemented in various ways. Preferably, the signal synthesis circuits 224, 226, 228, 230, 232 and amplifiers 244, 246, 248, 250, 252 are comparatively "low cost" circuits, because each is replicated a number of times. As a result, and in one embodiment, each of the signal synthesis circuits 224, 226, 228, 230, 232 may comprise a direct digital synthesis (DDS) circuit. DDS circuits are useful because of their ability to phase lock to the fundamental frequency of the CW signal, and thereby synthesize a CW signal 234 and nulling tones 236, 238, 240, 242 with locked phases and frequencies. In some cases, the phases of the nulling tones 236, 238, 240, 242 may be tuned via programmable delay elements. However, programmable delay elements may only be practical for higher frequency output signals.

Because DDS circuits cannot currently generate high-frequency signals (e.g., 20 GHz signals), frequency translators may be respectively coupled to the outputs of each DDS circuit.

Figure 3:
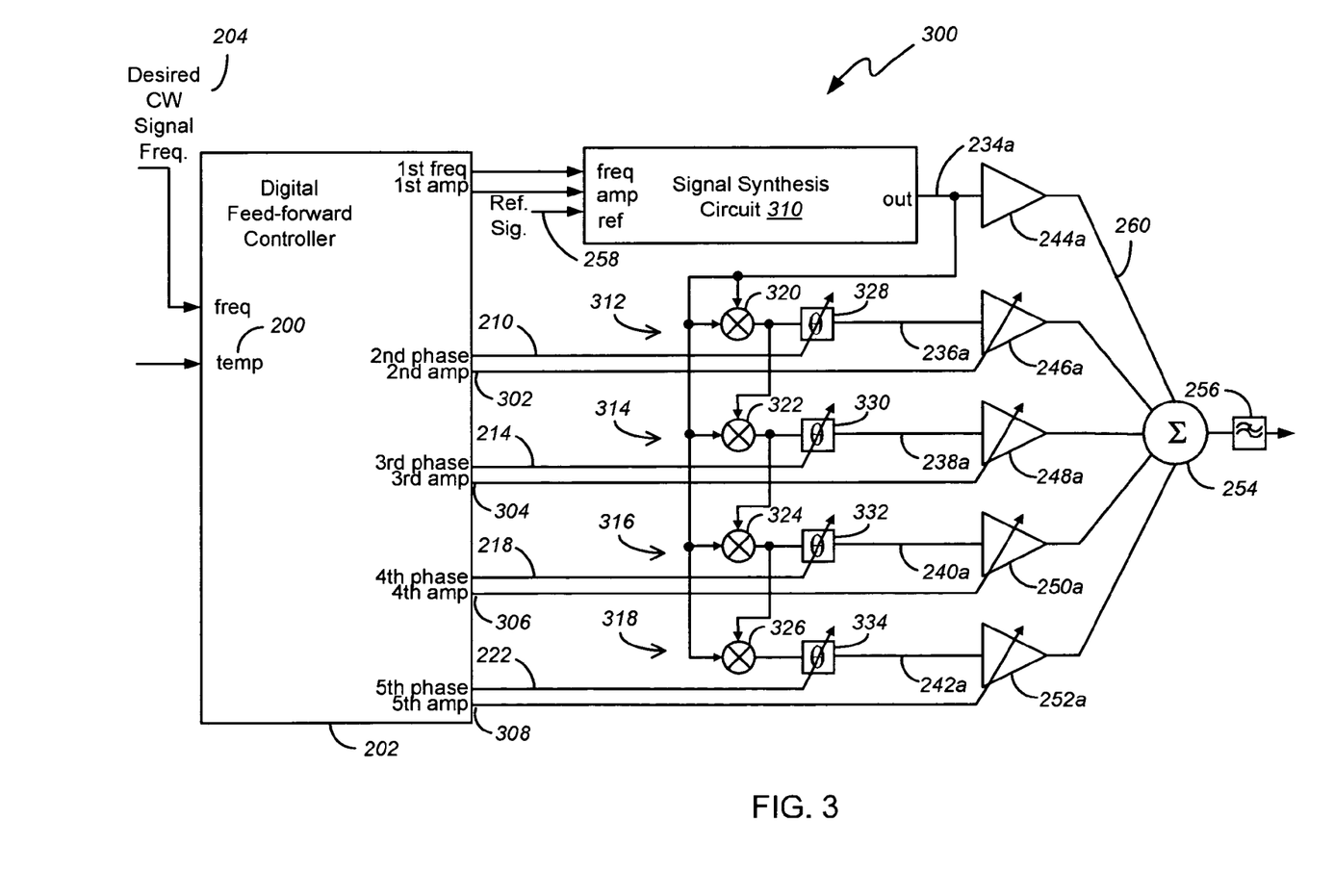
FIG. 3 illustrates second exemplary apparatus for implementing the method of FIG. 1 and other methods.

FIG. 3 illustrates another exemplary embodiment of apparatus 300 (FIG. 3) for implementing the method 100. The apparatus 300 comprises a digital feed-forward controller 202a that is similar in many ways to the controller 202. However, the controller 202a receives only a frequency indicator 204 of a CW signal parameter set, and then generates a frequency indicator and an amplitude indicator (1st freq, 1st amp) for the CW signal. The frequency and amplitude indicators are then provided to a signal synthesis circuit 310 that synthesizes a CW signal 234a. The controller 202a also generates at least one parameter set for at least one harmonic of the CW signal. However, in the case of the controller 202a, and by way of example, each of the parameter sets for the harmonics of the CW signal is shown to comprise a phase indicator and an amplitude indicator (labeled in FIG. 3 as 2nd phase 210 and 2nd amp 302, 3rd phase 214 and 3rd amp 304, 4th phase 218 and 4th amp 306, and 5th phase 222 and 5th amp 308).

The apparatus 300 further comprises a plurality of signal synthesis circuits 310, 312, 314, 316, 318, including i) the signal synthesis circuit 310 for synthesizing the CW signal 234a in response to a parameter set for the CW signal 234a, and ii) at least one additional signal synthesis circuit 312, 314, 316, 318 configured to respectively synthesize at least one nulling tone 236a, 238a, 240a, 242a in response to the at least one harmonic of the CW signal.

By way of example, each of the signal synthesis circuits 312, 314, 316, 318 that synthesizes a nulling tone 236a, 238a, 240a, 242a comprises 1) a circuit 320, 322, 324, 326 for synthesizing a nulling tone at a desired frequency, and 2) a phase adjustor circuit 328, 330, 332, 334 that is responsive to a respective phase indicator 210, 214, 218, 222 output by the controller 202a. Of note, the nulling tone synthesizer circuits 320, 322, 324, 326 each receive 1) the CW signal 234a, and 2) a next higher order harmonic (or the fundamental frequency) of the CW signal 234a. In this manner, each nulling tone 236a, 238a, 240a, 242a is based on the fundamental frequency of the CW signal 234a, and the signal synthesis circuits 312, 314, 316, 318 do not require phase locking to the reference signal 258.

The apparatus 300 further comprises a plurality of non-ideal amplifiers 244a, 246a, 248a, 250a, 252a for respectively amplifying the CW signal 234a and at least one nulling tone 236a, 238a, 240a, 242a output from the signal synthesis circuits 310, 312, 314, 316, 318. In some embodiments, the non-ideal amplifiers 244a, 246a, 248a, 250a, 252a may be power amplifiers, although they need not be. The amplifiers 246a, 248a, 250a, 252a are also responsive to respective amplitude outputs 302, 304, 306, 308 of the controller 202a, to adjust the amplitudes to which the nulling tones 236a, 238a, 240a, 242a are amplified. Similarly to the apparatus 200 (FIG. 2), a summer 254 sums the amplified CW signal and at least one amplified nulling tone to produce a linearized amplified CW signal 256.

The method 100 and apparatus 200, 300 illustrated in FIGS. 1-3 may be used to null any number of spur frequencies. However, past work suggests that, for non-clipping signals, power amplifiers are 'weakly nonlinear'. As such, the first few harmonics dominate. In addition, because power amplifiers are weakly distorting (for example, their harmonics are below −40 dBc), the harmonics introduced by the nulling signal amplifiers 246, 248, 250, 252 (or 246a, 248a, 250a, 252a) will be at least another 40 dB below those of the spur amplitudes. Hence the distortion along the correction path does not introduce significant distortion in the output signal. As a result, and in some embodiments, the method 100 and apparatus 200, 300 may only generate parameter sets for second and third order harmonics of the CW signal.

Signals produced by simulating the apparatus 200 are shown in FIGS. 4-7. The simulation on which the signals shown in FIGS. 4-7 are based assumes that the simulated apparatus 200 is provided with simulated power amplifiers 224, 226, 228, 230, 232, each having harmonics at or below −40 dBc. The simulation also assumes that the parameter sets 208/210, 212/214, 216/218, 220/222, from which the simulated nulling tones 236, 238, 240, 242 are synthesized, are computed based on a nonlinearity model of the simulated power amplifiers 244, 246, 248, 250, 252.

Figure 4:
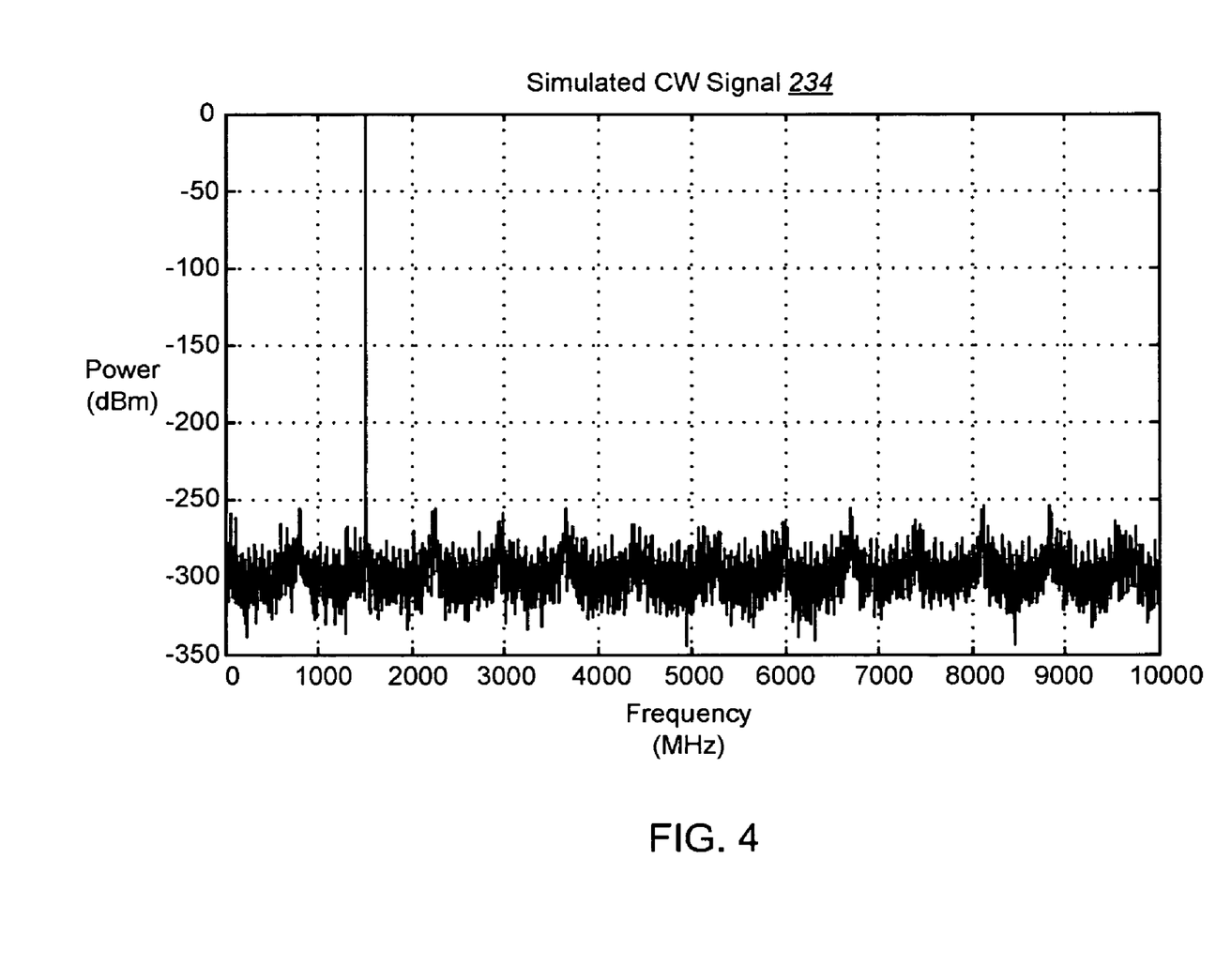
FIG. 4 illustrates a simulated CW signal of the apparatus shown in FIG. 2.
Figure 5:
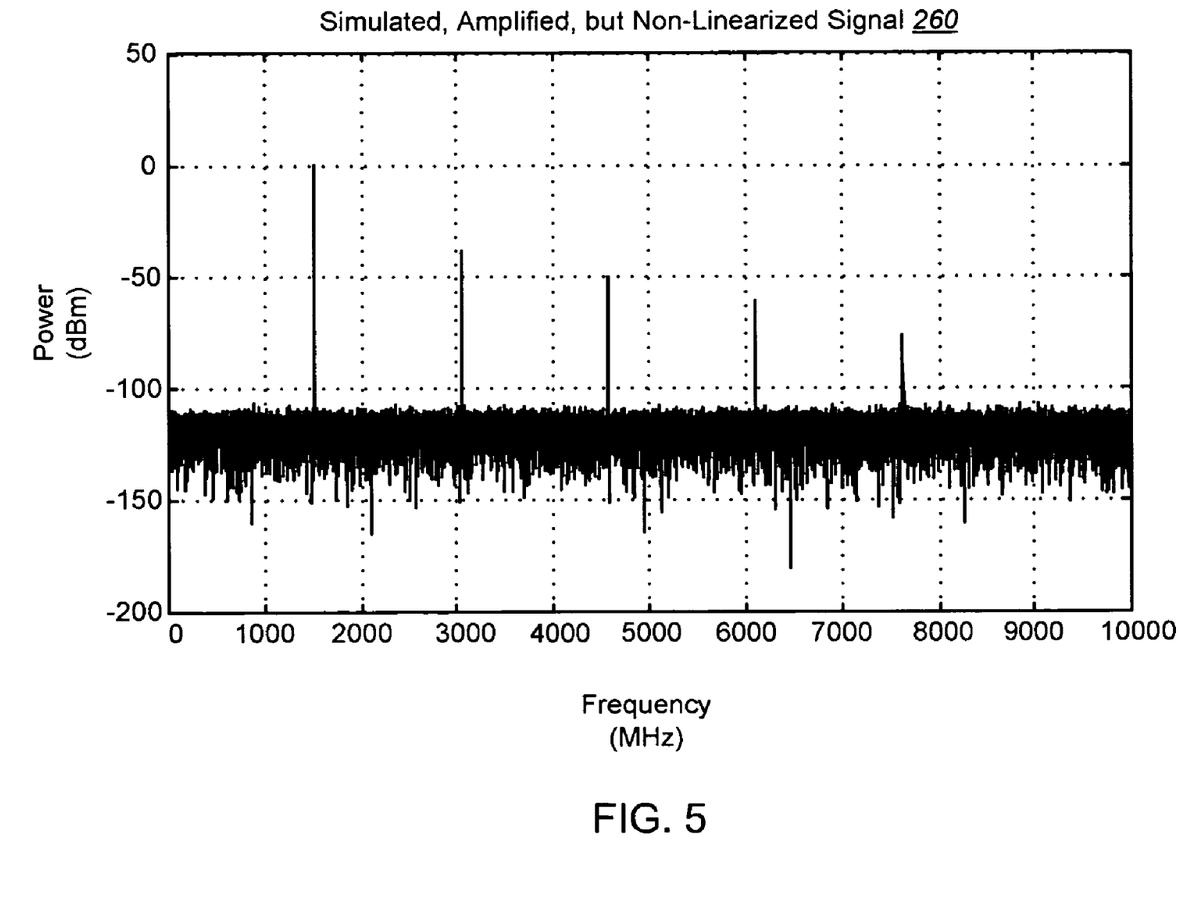
FIG. 5 illustrates a simulated output of one of the non-ideal amplifiers shown in FIG. 2, in response to the simulated CW signal shown in FIG. 4.
Figure 6:
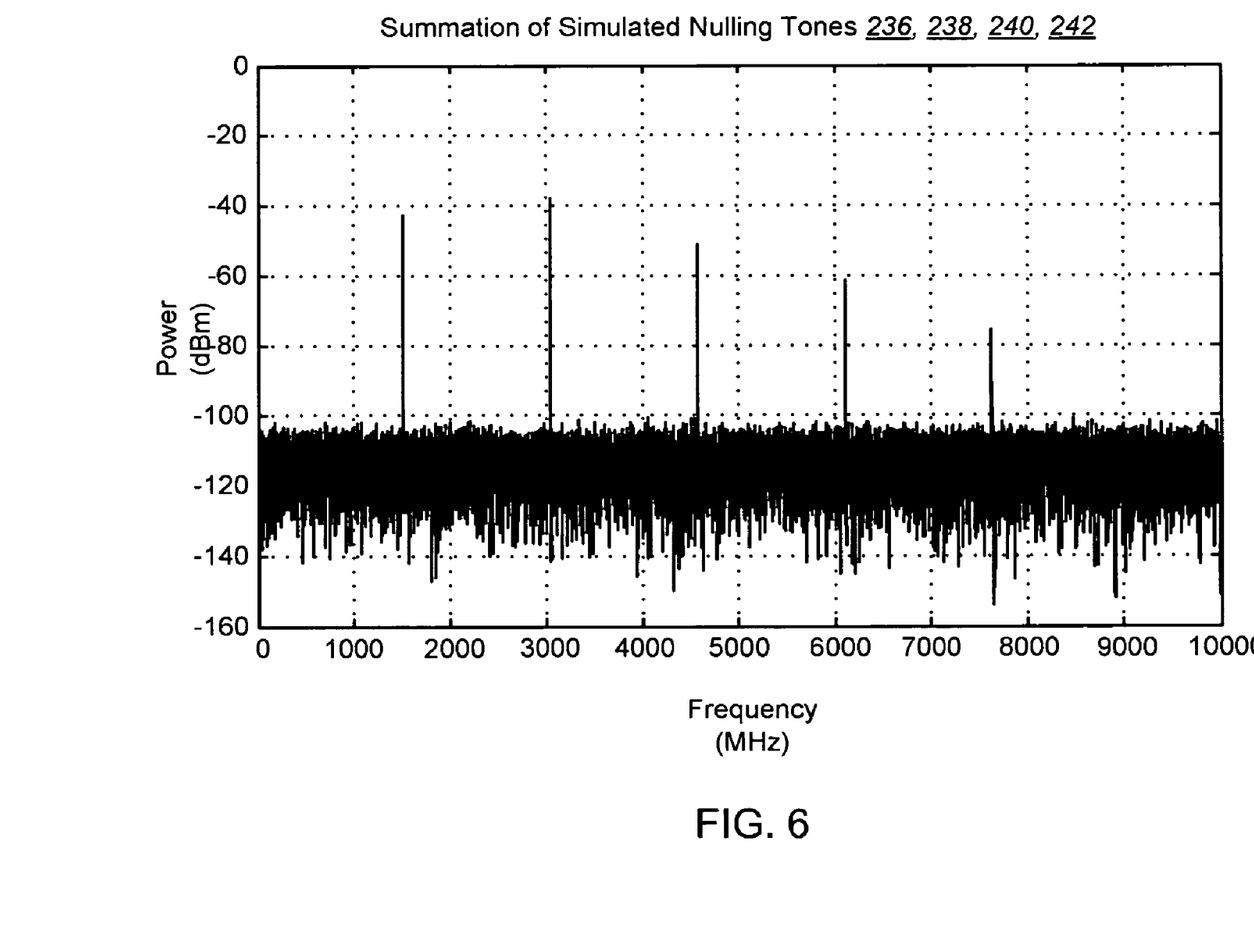
FIG. 6 illustrates a summation of simulated nulling tones produced by the apparatus shown in FIG. 2.

FIG. 4 illustrates a simulated CW signal 234 of the simulated apparatus 200. The simulated CW signal 234 may be input to the simulated power amplifier 244 to generate a simulated, amplified, but non-linearized CW signal 260 (see FIG. 5). FIG. 6 illustrates a summation of the simulated nulling tones 236, 238, 240, 242. Of note, the simulation assumes that there is no phase noise or jitter in the simulated CW signal 234, or in the simulated nulling tones 236, 238, 240, 242. Also, the simulated apparatus 200 has perfectly phase-locked signals 234, 236, 238, 240, 242. In addition, the simulation length is chosen to minimize spectral leakage and ensure that the fundamental and harmonic frequencies are centered on discrete Fourier transform (DFT) frequency bins.

Figure 7:
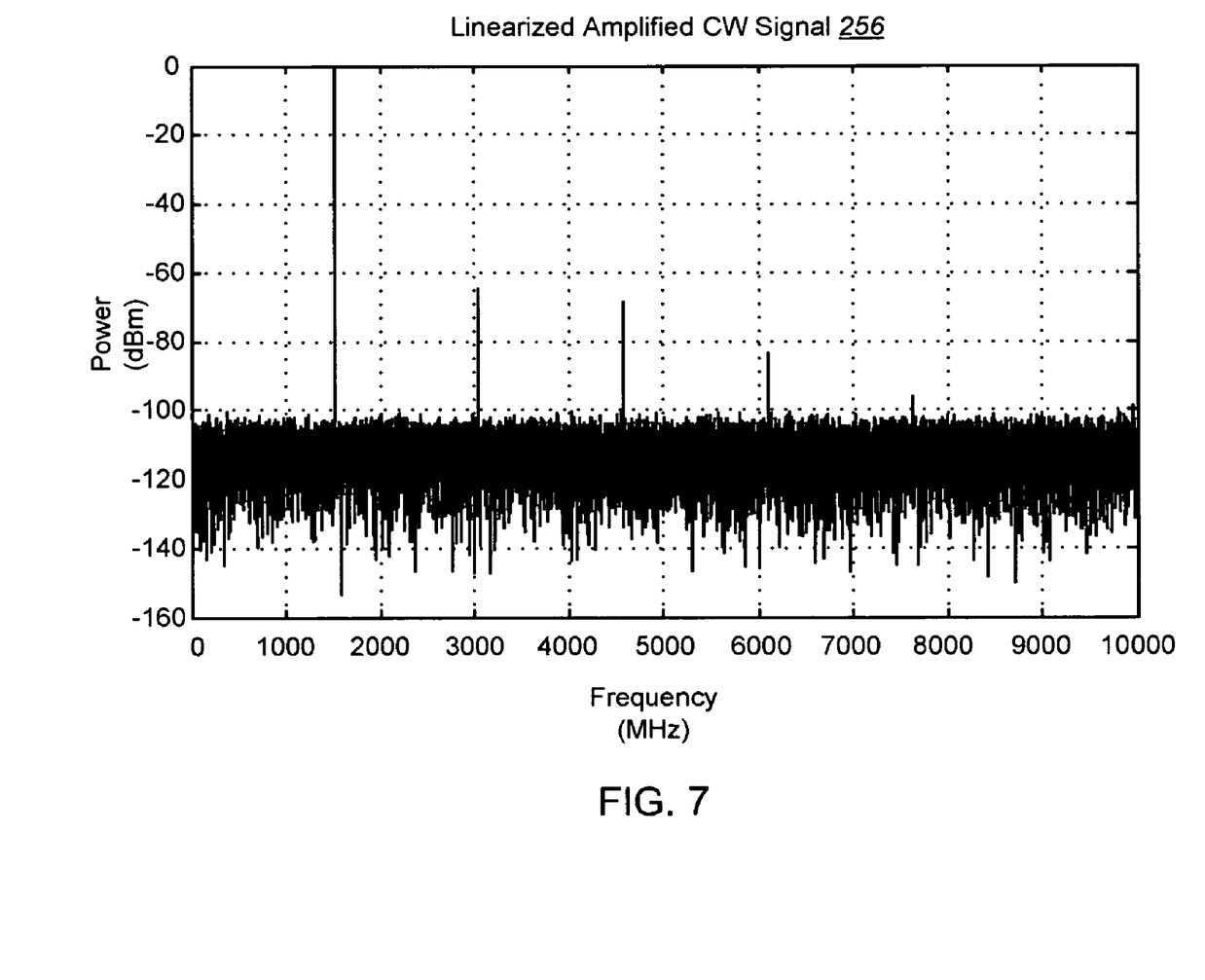
FIG. 7 illustrates a simulated linearized amplified CW signal produced by the apparatus shown in FIG. 2, in response to the simulated CW signal shown in FIG. 4 and the simulated nulling tones shown in FIG. 6.
Figure 8:
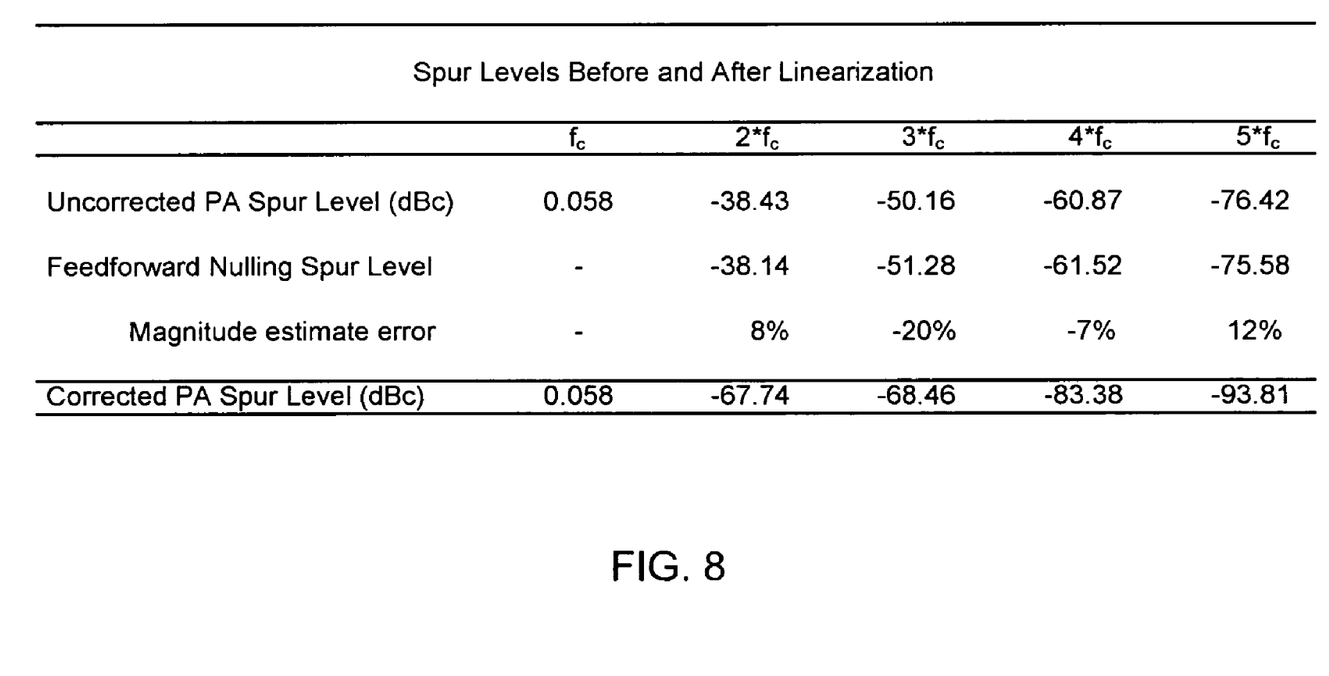
FIG. 8 illustrates simulated spur levels before and after linearization, in the context of the apparatus shown in FIG. 2, the simulated CW signal shown in FIG. 4, and the simulated nulling tones shown in FIG. 6.

FIG. 7 illustrates a simulated linearized amplified CW signal 256 produced by the apparatus 200, in response to the simulated CW signal 234 shown in FIG. 4 and the simulated nulling tones 236, 238, 240, 242 shown in FIG. 6. As shown, even with an imprecise knowledge of spur magnitude, significant harmonic cancellation is possible, as shown in FIG. 8, which illustrates simulated spur levels before and after linearization (e.g., 8% error ->30 dB suppression).

The method 100 and apparatus 200 can provide extremely broadband linearization of a CW signal, by 1) digitally, and in a feed-forward manner, generating parameter sets that define one or more nulling tones corresponding to the spur frequencies of a CW signal, and then 2) amplifying and summing the CW signal and nulling tones in an analog domain. Use of the common reference signal 258, as well as constructing respective signal synthesis circuits 224, 226, 228, 230, 232 and non-ideal amplifiers 244, 246, 248, 250, 252 as matched circuits, helps to ensure that the nulling tones 236, 238, 240, 242 have precise phase and frequency relationships with respect to the fundamental frequency of the CW signal 234.

One disadvantage of the apparatus 900 shown in FIG. 9 is that it requires multiple passive filters 910, 912, 914, 916 and RF switches 908, 920. This is an expensive solution in both price and power (as well as size). Power-wise, an implementation of the apparatus 900 may require 50 Watts to operate but yield only 0.1 Watts of high fidelity signal 922, due to amplifier inefficiency, filtering loss, and switching loss. An additional disadvantage of the apparatus 900 is that the phase of the output signal 922 can shift abruptly as the filters 910, 912, 914, 916 are switched in and out. This behavior is not desirable for some applications. In contrast, the apparatus 200 can be built using multiple lower cost and lower performance signal synthesis circuits 224, 226, 228, 230, 232 and amplifiers 244, 246, 248, 250, 252. Also, because the method 100 and apparatus 200 rely on digital feed-forward methods, the magnitude and phase of the linearized amplified CW signal 256 are precisely known and digitally adjustable. This eliminates the abrupt phase shifts due to switching filters into and out of the signal path.

Although the embodiments of the method 100 and apparatus 200 described herein provide for linearization of a single CW signal (or tone), the method 100 and apparatus 200 are not limited to the linearization of a single CW signal. However, linearization pf two or more CW signals requires the synthesis of an ever increasing number of nulling tones. For example, one CW signal requires two nulling tones to null spurs due to second and third order harmonics, while two CW signals (superimposed) require ten nulling tones to null spurs due to second and third order harmonics.

The method 100 and apparatus 200 have various applications. In one application, the linearized amplified CW signal produced by the method 100 or apparatus 200 may be used to transmit a network stimulus from a network analyzer. A network analyzer is a type of measurement instrument used for conducting stimulus/response testing of a network. Often, the quality of the stimulus signal impacts the information retrieved in the response (i.e., a lower fidelity stimulus results in lower fidelity response). Thus, the method 100 and apparatus 200 are useful in the realm of network analysis. In addition, the method 100 and apparatus 200 are useful in other applications where wideband linear amplification of simple signals is needed.

What is claimed is:

1. Apparatus, comprising:
   a digital feed-forward controller, configured to, in response to a parameter set for a continuous wave (CW) signal, generate at least one parameter set for at least one harmonic of the CW signal;
   a plurality of signal synthesis circuits, including i) a first signal synthesis circuit configured to synthesize the CW signal in response to the parameter set for the CW signal, and ii) at least one additional signal synthesis circuit configured to respectively synthesize at least one nulling tone in response to the at least one harmonic of the CW signal;
   a plurality of non-ideal amplifiers for respectively amplifying the CW signal and the at least one nulling tone; and
   a summer for summing the amplified CW signal and the at least one amplified nulling tone to produce a linearized amplified CW signal.

2. The apparatus of claim 1, wherein the digital feed-forward controller generates the at least one parameter set, for the at least one harmonic of the CW signal, by indexing at least one lookup table in response to the parameter set for the CW signal.

3. The apparatus of claim 1, wherein the digital feed-forward controller comprises at least one digital filter that generates the at least one parameter set, for the at least one harmonic of the CW signal, in response to the parameter set for the CW signal.

4. The apparatus of claim 1, wherein the digital feed-forward controller implements a mathematical function to derive the at least one parameter set, for the at least one harmonic of the CW signal, from the parameter set for the CW signal.

5. The apparatus of claim 1, wherein each of i) the parameter set for the CW signal, and ii) the at least one parameter set for the at least one harmonic of the CW signal, comprises at least one indicator selected from the group consisting of: a frequency indicator, an amplitude indicator, and a phase indicator.

6. The apparatus of claim 1, wherein the at least one parameter set for the at least one harmonic of the CW signal comprises parameter sets for at least second and third harmonics of the CW signal.

7. The apparatus of claim 1, wherein each of the plurality of signal synthesis circuits comprises a direct digital synthesis circuit.

8. The apparatus of claim 1, wherein each of the plurality of signal synthesis circuits comprises i) a direct digital synthesis circuit, and ii) a frequency translator coupled to an output of the direct digital synthesis circuit.

9. The apparatus of claim 1, wherein each of the signal synthesis circuits receives a common reference signal and is configured to phase lock to the common reference signal.

10. The apparatus of claim 1, wherein the digital feed-forward controller is further configured to generate the at least one parameter set, for the at least one harmonic of the CW signal, in response to a temperature of at least one of the plurality of non-ideal amplifiers.

11. A method, comprising:
   in response to a parameter set for a continuous wave (CW) signal, digitally generating at least one parameter set for at least one harmonic of the CW signal;
   synthesizing the CW signal in response to the parameter set for the CW signal;
   synthesizing at least one nulling tone in response to the at least one parameter set for the at least one harmonic of the CW signal;
   amplifying the CW signal and the at least one nulling tone; and
   summing the amplified CW signal and the at least one amplified nulling tone to produce a linearized amplified CW signal.

12. The method of claim 11, wherein generating the at least one parameter set for the at least one harmonic of the CW signal comprises indexing at least one lookup table in response to the parameter set for the CW signal.

13. The method of claim 11, wherein generating the at least one parameter set for the at least one harmonic of the CW signal comprises implementing a mathematical function that derives the at least one harmonic of the CW signal from the parameter set for the CW signal.

14. The method of claim 11, wherein each of i) the parameter set for the CW signal, and ii) the at least one parameter set for the at least one harmonic of the CW signal, comprises at least one indicator selected from the group consisting of: a frequency indicator, an amplitude indicator, and a phase indicator.

15. The method of claim 11, wherein the at least one parameter set for the at least one harmonic of the CW signal comprises parameter sets for only second and third harmonics of the CW signal.

16. The method of claim 11, further comprising, synthesizing the CW signal and the at least one nulling tone to phase lock with a common reference signal.

17. The method of claim 11, further comprising, generating the at least one parameter set for the at least one harmonic of the CW signal in response to a temperature of at least one non-ideal amplifier used to perform the amplifying.

18. The method of claim 11, further comprising, using the linearized amplified CW signal to transmit a network stimulus from a network analyzer.

19. The method of claim 11, further comprising:
   measuring phases and amplitudes of harmonics produced by at least one non-ideal amplifier used to perform the amplifying; and
   using the measured phases and amplitudes of the harmonics produced by the at least one non-ideal amplifier to calibrate the generating of the at least one parameter set for the at least one harmonic of the CW signal.

20. Apparatus, comprising:
   means for, in response to a parameter set for a continuous wave (CW) signal, digitally generating at least one parameter set for at least one harmonic of the CW signal;
   means for synthesizing the CW signal in response to the parameter set for the CW signal;
   means for synthesizing at least one nulling tone in response to the at least one parameter set for the at least one harmonic of the CW signal;
   means for amplifying the CW signal and the at least one nulling tone; and
   means for summing the amplified CW signal and the at least one amplified nulling tone to produce a linearized amplified CW signal.

* * * * *